United States Patent [19]

Stilwell

[11] 4,154,013
[45] May 15, 1979

[54] DEVICE FOR TRAINING RETRIEVER DOGS

[76] Inventor: Robert L. Stilwell, 4216 Lomhard Dr., Klamath Falls, Oreg. 97601

[21] Appl. No.: 889,652

[22] Filed: Mar. 24, 1978

[51] Int. Cl.² .................................................. F41C 27/06
[52] U.S. Cl. ...................................................... 42/1 F
[58] Field of Search ........................ 42/1 F, 59, 75 B; 102/65.2

[56] References Cited

U.S. PATENT DOCUMENTS

| | | | |
|---|---|---|---|
| 2,883,781 | 4/1959 | Harvey | 42/1 F |
| 3,004,360 | 10/1961 | Johnson | 42/1 F |
| 3,176,422 | 4/1965 | Harris | 42/59 |
| 3,186,119 | 6/1965 | Maras et al. | 42/1 F |
| 3,392,469 | 7/1968 | Dubini | 42/1 F |
| 3,505,926 | 4/1970 | Johnson | 42/1 F |
| 3,731,418 | 5/1973 | Birkenhagen et al. | 42/75 B |

OTHER PUBLICATIONS

Remington Arms Company, Inc., "Dog Trainer Kit" Mar. 29, 1965.
"Retriev-R-Trainer" Sporting Dog Specialties Inc. p. 73.

Primary Examiner—Charles T. Jordan
Attorney, Agent, or Firm—Chernoff & Vilhauer

[57] ABSTRACT

A device for training retriever dogs comprising a launcher, having a pistol grip, from which a plurality of projectiles to be retrieved by a dog are sequentially launched by a plurality of explosive propellant charges automatically and sequentially indexed into proper position for discharge.

5 Claims, 3 Drawing Figures

DEVICE FOR TRAINING RETRIEVER DOGS

BACKGROUND OF THE INVENTION

This invention relates to devices used to aid in training retriever dogs for use in hunting fowl, and particularly to devices which simultaneously produce an explosive report and throw an object for a dog to locate and retrieve.

Retriever dogs, before being helpful in hunting wild birds, must be properly trained to wait until the game has been shot before running into the zone of danger from the hunter's weapon, and to thereafter find and retrieve the bird which has been brought down. The dogs must also become accustomed to the sound of a firearm being discharged, and associate that sound with retrieving. In the past this has usually meant training during actual hunting, a process possibly dangerous for the dog, or training carried out by two people together, one handling the dog and a firearm, and the other throwing or placing decoys to be retrieved. Another previously known method of training retriever dogs is the use of a device to launch retrievable projectiles from a launcher operable by a single person conducting the training alone.

One previous device designed for such use comprises an elongate cylindrical launcher guide having a chamber for receiving a single manually loaded 0.22 caliber blank cartridge, which is used as an explosive propellant for a projectile, and a central bore extending from the chamber along the longitudinal axis of the guide to a single angularly offset orifice leading outwardly to the surface of the guide. The projectile comprises a tubular metal liner closed at one end and surrounded by a yieldable covering material, the liner and covering material being adapted to slip matingly over the launcher guide to be propelled by expanding gases from the fired cartridge. An "O"-ring in an annular groove on the guide helps seal in propellant gases. A hinge joint connects the base of the launcher guide to a breech-block plate which closes the rear of the chamber and has a handle extending rearwardly from and coaxially with the guide when the chamber is closed and the device is ready for firing. A latch hinged to the base of the launcher guide must also be gripped by the operator during firing to keep the chamber from opening when the propellant charge is exploded.

A major disadvantage of the foregoing prior art launcher is that its operation requires the use of two hands. Thus, it is impossible to simultaneously launch a retrievable projectile and hold the dog being trained. In use, one hand is used to hold the handle and the aforementioned latch, while with the other hand the operator pulls, and then releases, a rod connected to a spring-biased firing pin.

Another major disadvantage of this type of launcher is the awkwardness of using it. Because a significant recoil occurs when the launcher is discharged, it must be held at the operator's side when being discharged. The coaxial alignment of handle and guide make a very strong grip necessary to hold the launcher securely.

Even when the operator is wearing a glove on the hand used to hold this type of launcher, the crude arrangement of the securing latch and handle hinge often results in bruising or laceration of the hand in which the device is held.

A further disadvantage of the previous device is that the single offset orifice leading from the launcher guide bore to the exterior surface of the launcher guide can cause uneven distribution of propellant force to the projectile, causing the projectile to tumble in flight and resulting in an erratic trajectory.

It is most desirable to launch multiple targets in quick succession for the dog being trained to retrieve. Usually a set of three targets is desired, yet the previous type of launcher can launch only one projectile, after which the launcher must be opened, a new propellant cartridge manually inserted and the chamber closed, a process which is too time-consuming to simulate actual hunting conditions.

SUMMARY OF THE INVENTION

The aforementioned drawbacks of prior art devices for training retriever dogs, which render them awkward and ineffective and limit their safety, are overcome by the present invention which provides a novel training device especially designed for safe, one-handed operation and rapid launching of succeeding projectiles.

The training device of the present invention comprises a frame, with a pistol grip and trigger assembly, in which is contained a magazine for accepting a plurality of explosive propellant cartridges and successively advancing these cartridges to a discharge station automatically in response to pulling the trigger. A cylindrical elongated launcher guide, for launching specially designed projectiles which are suitable for a dog to carry safely and easily, is detachably connected to the frame in alignment with the discharge station. A central launcher bore extending along the longitudinal central axis of the launcher guide is open at a rear end to receive gases discharged from the propellant cartridge, and is closed at the other, or front, end except for a plurality of substantially symmetrically spaced orifices which intersect the central launcher bore at an angle and allow the expanding gases to exit.

The plurality of symmetrically spaced orifices disposed about the front end of the launcher guide aids in imparting a uniform distribution of the impulsive forces of the expanding propellant gases to the projectile, thus reducing the tendency of the projectile to tumble in flight and making the trajectory of the projectile more predictable.

The retrievable projectile comprises a metal liner tube, closed at one end, which slidingly fits over and around the launcher guide. A soft, lightweight covering material, such as molded styrofoam, covers the liner tube except for the open end to create suitable wind resistance and to provide a yielding exterior surface which a dog can easily and safely hold in its mouth.

For operation of the device, a plurality of propellant charges are placed into the magazine. A single retrievable projectile is placed slidably upon the launcher guide and the device of the invention is held in one hand by the pistol grip, pointed at an upward angle in the direction desired for launching the projectile and held away from the dog trainer's face. The trigger is moved rearwardly, causing discharge of the propellant cartridge, and expanding gases from the propellant cartridge travel through the central launcher bore. Propellant gases exit from the central launcher bore via the orifices into the interior of the closed-ended liner tube of the retrievable projectile. This launches the projectile in the desired direction, and simultaneously makes an explosive report similar to that of a firearm. The noise creates in the dog a mental association of firearm discharge noise with locating and retrieving birds shot down by hunters.

Since it is desirable to have more than one object to be located by the dog, simulating downing more than one bird from a group flushed together, the dog trainer may launch additional retrievable projectiles in quick succession by simply sliding them individually onto the launcher guide and discharging them as explained above, accomplishing this much more quickly than with previous devices. If desired, additional propellant cartridges may also be discharged without the use of a projectile, to give only the audible report.

The pistol grip and trigger-operated discharge structure of the present invention allow one-handed operation of the device, once it is loaded. This is far more convenient than the awkward, two-handed operation of prior devices. Thus the operator can hold his dog with one hand while launching one or more retrievable projectiles with the other.

The pistol grip of the invention also makes absorbing recoil from the launching much safer and easier. It also eliminates the danger of bruising or cutting the operator's hand which is present in prior devices, whose latch lever sometimes cuts the operator's hand. It is not necessary, therefore, to wear a heavy protective glove for safety when operating the device of the present invention.

The detachable connection of the launcher guide to the frame allows use of a standard pistol frame, thereby allowing multiple uses of the frame by the end user. It is preferable to connect the launcher guide to the frame by threading and pinning it in a mating threaded socket, such as the barrel socket of a pistol frame, but a threaded attachment at the end of an externally threaded but otherwise ordinary pistol barrel is an acceptable alternative.

Accordingly, it is a primary objective of the present invention to provide an explosive cartridge device for training retriever dogs, of the general type described, which allows operation using only one hand.

It is another objective to provide such a dog-training device which does not create any danger of lacerating the hands of the operator.

It is another objective to provide such a dog-training device which allows rapid successive launching of a plurality of retrievable projectiles simulating actual hunting conditions when multiple birds are downed successively, and creates audible explosive reports simultaneous with launching of each projectile.

It is a principal feature of the present invention that it has a pistol grip providing safe and easy operation with one hand, and easy absorption of recoil.

It is another feature of the invention that a plurality of projectiles may be launched and propellant charges may be discharged in rapid succession without replenishing the propellant charges within the device.

It is yet a further feature of the invention that the launcher guide is detachable, allowing use of the frame with a pistol barrel.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
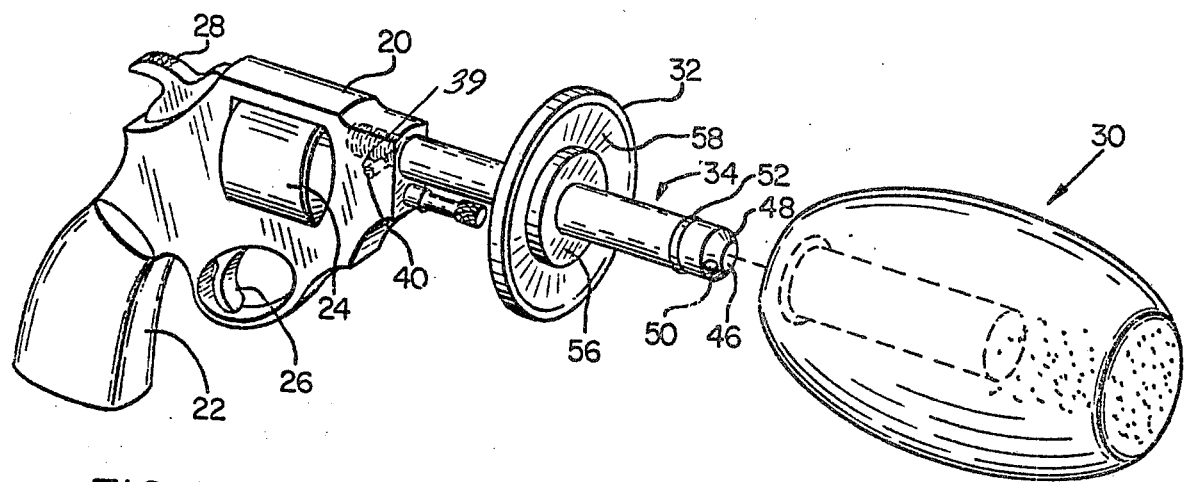
FIG. 1 is a perspective, exploded view of the preferred embodiment of the invention.
Figure 2:
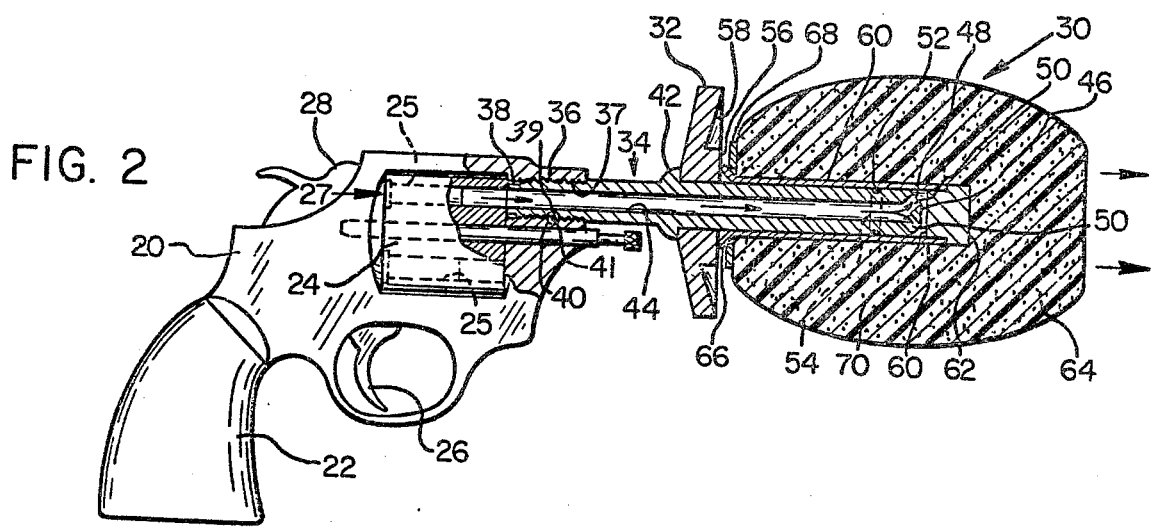
FIG. 2 is a partially sectional view of the preferred embodiment of the invention.

Referring to FIGS. 1 and 2, it is seen that the preferred embodiment of the invention comprises a frame 20 to which is attached a pistol grip 22. A cylindrical magazine 24 rotatably mounted on the frame holds in readiness a plurality of radially spaced propellant charges 25 in cartridge form within open-ended cylindrical chambers.

A trigger 26 operates a hammer 28 by conventional means in response to the pulling of the trigger, the hammer being biased by a spring, not shown, to cause a firing pin, also not shown, to strike and discharge the propellant cartridge 25 in a discharge station 27, sending expanding gases into the interior of a launcher bore 44, FIG. 2, formed longitudinally through an elongated launcher guide 34. The expanding gases are directed by the launcher bore 44 to the interior of a retrievable projectile 30 thereby propelling the projectile linearly along the launcher guide and launching it into ballistic flight. A radially projecting gas deflector 32, fixed to the launcher guide 34 and supported axially of the guide by a shoulder 42 thereon, protects the operator's hand and body from expanding gases as they escape from projectile 30 upon its launch.

Referring to FIG. 2, a rear portion 36 of the cylindrical launcher guide 34 is externally threaded, allowing it to be screwed into an elongate, internally threaded cylindrical socket 37 in frame 20 in a position such that the bore 44 is axially aligned with the propellant cartridge 25 when the cartridge 25 is in the discharge station 27. A cylindrical, reduced diameter rear end 38 of launcher guide 34 extends further rearwardly to a position closely adjacent to a forward side of the cylindrical magazine 24. The launcher guide 34 is further secured to the frame 20 by a retaining pin 40 fitted lockingly through a hole 39 in frame 20 and a corresponding notch 41 in the threaded rear portion 36 of the launcher guide 34, the hole 39 tangentially intersecting the socket 37, to prevent undesired loosening.

The bore 44 extends linearly along the central longitudinal axis of the launcher guide 34 and is open at the rear end 38 and closed at a front end 46 of the launcher guide. The front end 46 of the launcher guide 34 is circumscribed by an annular beveled area 48.

A plurality of orifices 50 extend inwardly from the beveled area 48 to intersect and communicate with the launcher bore 44, providing an exit path for propellant gases emitted from within the cartridge 25 upon discharge through the launcher bore 44. The orifices 50 are symmetrically spaced and equal in size and each intersects bore 44 at the same angle, to equally distribute the propulsive force of expanding gas within projectile 30 in the preferred embodiment of the invention.

In a location slightly rearward from the beveled area 48, a resilient "O"-ring 52 is mounted in an annular groove 54 circumscribing the launcher guide 34, to provide a seal between the launcher guide 34 and the projectile 30 as it is launched. This feature is also found in the previously known device. A central face 56 of the gas deflector 32 extends radially from the launcher guide 34 at a distance rearward from the front end 46 sufficient to allow projectile 30 to be fully seated on the launcher guide 34. A gas deflector peripheral face 58 is angled slightly forward, presenting a shallow conical surface to deflect expanding propellant gases forward as well as outward from launcher guide 34.

Referring to FIG. 2, it is seen that projectile 30 comprises a metal liner tube 60 having a forward end closed by a fixedly attached plug 62, which extends partially within the liner tube 60. The exterior portions of the liner tube 60, except for its open rear end, are covered by a covering material 64 which is a lightweight, yielding substance, such as styrofoam, to provide an air resistant shape which limits the flight of projectile 30 to the desired distance, and also allows the projectile to be carried easily by the dog being trained.

The rearward extremity of tube 60 has an outwardly flared portion 66 which retains a flat, annular thrust-bearing member 68 which distributes the impulse caused by the propellant cartridge 25 from the liner tube 60 over the rear surface of the projectile 30, so that liner tube 60 is not harmfully propelled through the covering material 64.

The distance from the rearward edge of the flared portion 66 to a rearward face 70 of the plug 62 corresponds substantially to the distance from the front end 46 of launcher guide 34 to the surface of the central face 56 of the gas deflector 32. Thus, when the projectile 30 is in the ready-for-launch position, the volume of air enclosed within the liner tube 60, forward of the "O"-ring 52, is minimal, thereby maximizing the propellant effect upon firing.

To operate the device, trigger 26 is pulled rearwardly, causing the cylindrical magazine 24 to index a propellant cartridge 25 in the manner conventional for revolver-type firearms, into the discharge station 27, and simultaneously causing hammer 28 to move rearwardly and then forwardly to initiate discharge of the propellant cartridge 25 contained in magazine 24. The propellant cartridge 25 in the discharge station 27 is directly aligned with the rear end of the central bore 44, forcing the expanding gases to exit via orifices 50 into the interior of liner tube 60 of the projectile 30 forwardly of the sealing O-ring 52. Such expansion forces the projectile 30 forward into ballistic flight.

For multiple projectile launching in quick succession, it is necessary only to slip a new projectile 30 over the launcher guide 34 and pull the trigger 26 again, utilizing another one of the cartridges 25 previously placed in the magazine 24.

Figure 3:
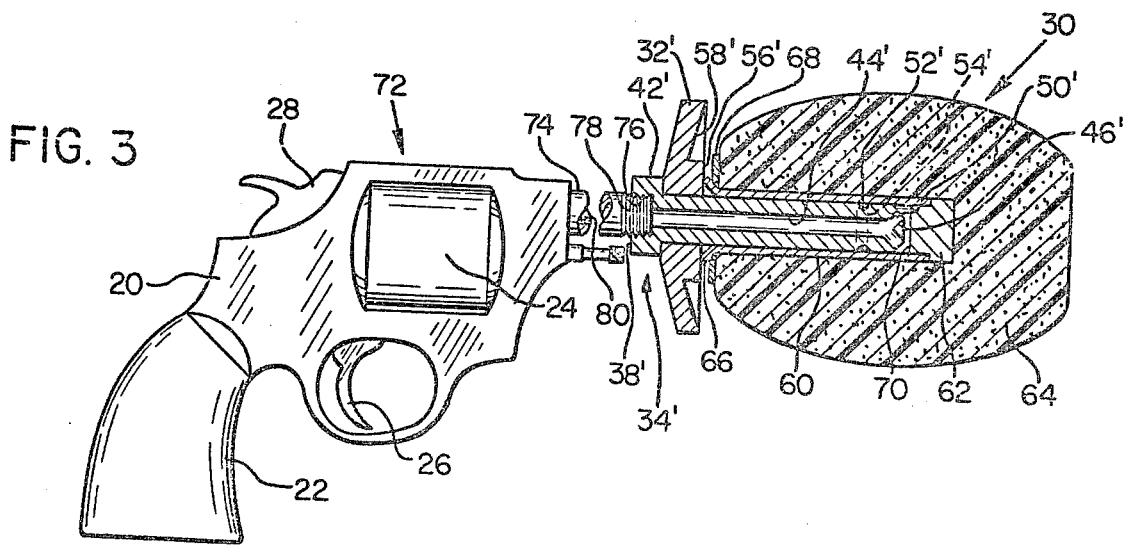
FIG. 3 is a partially sectional view of an alternative embodiment of the invention.

FIG. 3 shows an alternate embodiment of the invention wherein launcher guide 34' may be added to a pistol 72 having a specially prepared pistol barrel 74. In this embodiment of the invention shoulder 42' of launcher guide 34' defines a rearwardly opening rear end 38' having an internally threaded portion 76, in coaxial alignment with launcher bore 44', and the more rearward portions of the launcher guide 34 as shown in FIG. 2 are not present.

As in the previously described embodiment of the invention, shown in FIG. 2, the alternate embodiment of the invention includes a frame 20 having a pistol grip 22, in which is mounted a magazine 24 for holding a plurality of propellant charges 25, a trigger 26, and a hammer 28. The barrel 74 is mounted on the frame 20, and has a barrel bore 80 in alignment with a discharge station 27. An exterior helically threaded portion 78 of barrel 74, in coaxial alignment with the barrel bore 80, mates with the interior threaded portion 76 of shoulder 42' to detachably connect the launcher guide 34' to the specially prepared pistol barrel 74, with the barrel bore 80 of the barrel 74 in alignment with the launcher bore 44' of launcher guide 34'.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A device for training retriever dogs, comprising:
   (a) a frame having a pistol-type hand grip;
   (b) magazine means connected to said frame for holding a plurality of explosive propellant cartridges;
   (c) means associated with said magazine means for advancing successive propellant cartridges from storage positions in said magazine means to a discharge station;
   (d) discharge means mounted on said frame for selectively discharging said explosive propellant charges when in said discharge station, said discharge means being operable by one hand while said hand simultaneously grips said pistol-type hand grip;
   (e) a cylindrical, elongate launcher guide connected to said frame, said launcher guide having a rear end, a cylindrical external guiding surface, and a front end, and defining therein a central launcher bore extending longitudinally straightly along said launcher guide through a portion, less than all, of the distance from said rear end to said front end, said bore being open at said rear end, said launcher guide being so located relative to said discharge station that said launcher bore is in alignment with a propellant cartridge when said cartridge is in said discharge station;
   (f) a projectile having a cylindrical metal liner, said liner having a closed front end and an open rear end adapted for sliding matingly over said launcher guide in guiding contact with said external guiding surface, an outer cover portion of yieldable material substantially surrounding said metal liner, and means interacting between said metal liner and said outer cover portion for transferring propellant force from said liner to said outer cover portion; and
   (g) means defining a plurality of orifices communicating between said launcher bore and said front end of said launcher guide, each said orifice being at a forwardly extending angle with respect to said launcher bore, said orifices being positioned substantially symmetrically about said launcher guide and opening at positions forward of said external guiding surface, for distributing said propellant force symmetrically to said projectile after said projectile loses guiding contact with said guiding surface.

2. The device of claim 1 including mating means in said frame and said launcher guide for detachably connecting said launcher guide to said frame.

3. The device of claim 2 wherein said mating means comprises means defining an elongate, cylindrical socket in said frame axially aligned with said discharge station, means defining a hole tangentially intersecting said cylindrical socket, a cylindrical rear portion of said launcher guide matingly insertable into said elongate cylindrical socket, said rear portion having means defining a notch therein alignable with said hole when said rear portion is inserted in said socket, and a retaining pin extending through said hole and said notch, for retaining said rear portion within said cylindrical socket.

4. The device of claim 3 wherein said elongate cylindrical socket and said cylindrical rear portion of said launcher guide are matingly threaded.

5. The device of claim 2 wherein said mating means comprises a pistol barrel having a forward end and a barrel bore, said barrel being mounted in said frame with said barrel bore in alignment with said discharge station, an exterior threaded portion on said forward end of said barrel in coaxial alignment with said barrel bore and a mating interior threaded portion within said rear end of said launcher guide in coaxial alignment with said launcher bore for connecting said launcher guide to said pistol barrel with said launcher bore in alignment with said barrel bore.

* * * * *

UNITED STATES PATENT OFFICE
CERTIFICATE OF CORRECTION

Patent No. 4,154,013      Dated May 15, 1979

Inventor(s) Stilwell, Robert Lee

It is certified that error appears in the above-identified patent and that said Letters Patent are hereby corrected as shown below:

Change inventor's street title from "Lomhard" to --Lombard--

| | |
|---|---|
| Col. 3, Lines 55-56 | Change "replenshing" to --replenishing--. |
| Col. 5, Line 42 | Change "O-ring" to --"O"-ring-- |

Signed and Sealed this

Seventh Day of August 1979

[SEAL]

Attest:

LUTRELLE F. PARKER

*Attesting Officer*     *Acting Commissioner of Patents and Trademarks*